Aug. 23, 1938.  W. G. JAMES  2,128,093

TRANSFORMER TANK STRUCTURE

Filed April 26, 1935

WITNESSES:
C. J. Weller.
James N. Ely

INVENTOR
William G. James.
BY Ezra W. Savage
ATTORNEY

Patented Aug. 23, 1938

2,128,093

UNITED STATES PATENT OFFICE 2,128,093

TRANSFORMER TANK STRUCTURE

William G. James, West Middlesex, Pa., assignor to Westinghouse Electric & Manufacturing Company, East Pittsburgh, Pa., a corporation of Pennsylvania Application April 26, 1935, Serial No. 18,302

4 Claims. (Cl. 220—85)

This invention relates to transformer cases and is particularly adapted for use in transformer cases in which it is desired to have an oil or gas-tight joint between the cover and the case or between the different sections of the case where the transformer case is sectionalized.

An object of this invention is the provision of a simple and efficient joint construction which is adapted to provide leak-proof joints in cases for electrical apparatus.

The invention, together with additional objects and advantages thereof, will be better understood from the following description when read in conjunction with the accompanying drawing, in which.

Like reference characters indicate similar parts in the different figures of the drawing.

Figures 1, 2, 3, 4:
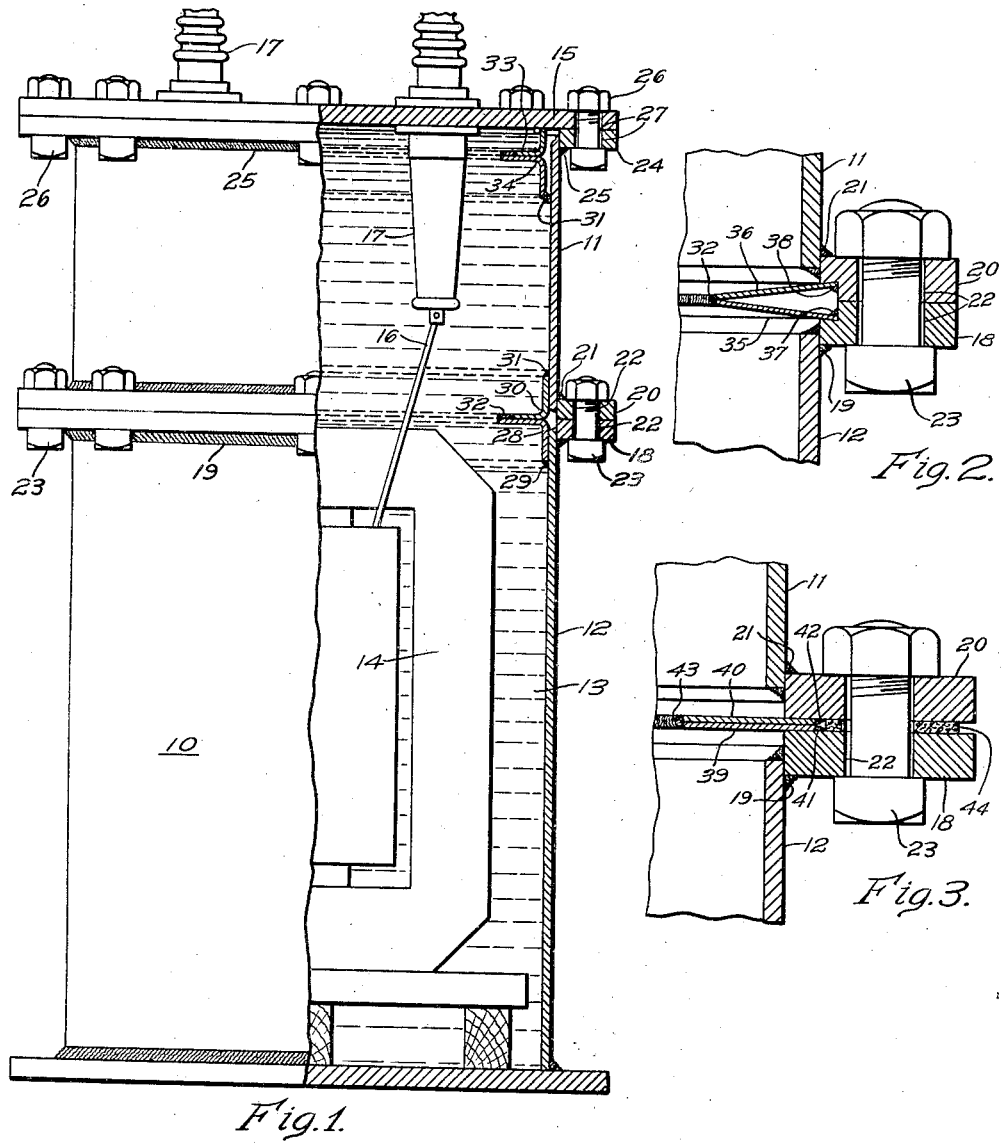
Figure 1 is a view, partly in elevation and partly in section, showing an oil immersed transformer in a case, the joints of which embody the features of this invention.
Fig. 2 is a vertical sectional view showing a joint between the upper and lower sections of a sectionalized case as embodied in a modification of this invention.
Fig. 3 is a vertical sectional view showing a joint between the upper and lower sections of a sectionalized case as embodied in a further modification of this invention.
Fig. 4 is a vertical cross-sectional view of the metallic bands which cover the joint between the upper and lower sections of the sectionalized case as embodied in a modification of this invention.

Referring to the drawing and particularly to Fig. 1, this invention is illustrated with reference to a sectionalized transformer case 10 comprising an upper section 11 and a lower section 12. The case 10 contains oil 13 or other suitable insulating liquid in which transformer 14 is immersed. A cover 15 is positioned on the case as will be hereinafter described. As is usual in the oil immersed transformers, case 10 is large enough to contain the oil necessary for cooling the transformer 14, the transformer lead 16 and the bushing 17.

In the embodiment of this invention illustrated in Fig. 1 a flanged ring 18 is provided around the case near the upper edge of the lower section 12 and is secured thereto by some suitable means as by a weld 19. The flanged ring 18 acts as a mechanically strong stop or rest for withstanding the weight of the upper section 11 when the upper section is mounted in the assembled position. A flange ring 20 is also provided around the lower edge of the upper section 11 and is so positioned as by a weld 21 to cooperate with the flanged ring 18 of the lower section 12. The cooperative flanged rings 18 and 20 of the lower and upper sections, respectively, are provided with openings 22 which are adapted to receive bolts 23 for securing the sections of the case together.

A similar flanged ring 24 is also provided around the upper end of the upper section 11 being securely fastened thereto as by a weld 25. The flanged ring 24 acts as a stop or rest for the cover 15 when the cover is mounted in assembled position on the case. In this embodiment the edges of the cover extend beyond the diameter of the case and are secured to the flanged ring 24 by bolts 26 positioned in the openings 27 therein to provide a closed case. The bolt openings and the bolts therein in the flanged ring and cover are so spaced around the case as to hold the mechanical stresses encountered in lifting and positioning the case.

In order to provide a leak-proof joint between the upper and lower sections of the case when finally assembled means is provided for sealing the joint therebetween. In a preferred modification, thin metallic bands or strips which have a cross-sectional area of substantially L-shape are provided to cover the joint between the sections. The metallic bands are preferably flexible so that they may be easily positioned to cover the joint between the sections.

One of the thin metallic strips 28 is provided around the inner circumference and near the top of the lower section 12 of the case 10. The member 28 is securely welded along its edge to the lower section by weld 29 and when so positioned has one of its legs in approximately the same horizontal plane as the upper edge of lower section 12. Another L-shaped member 30 is securely welded along its edge by a weld 31 to the inner circumference and around the lower edge of the upper section 11. When so positioned, one of the legs of L-shaped member 30 is in approximately the same horizontal plane as the lower edge of upper section 11. When the L-shaped members 28 and 30 are thus welded to the lower and upper sections, respectively, and the sections are in the assembled position, the legs of the band members 28 and 30 in the horizontal planes are in contact, and as illustrated are securely welded together along the edges as at 32. Such a leak-proof engagement of the band members provides a leak-proof joint between the upper and lower sections.

Similar band members 33 and 34 may be employed between the cover 15 and the upper case 11 in effecting a leak-proof joint between the cover and the case. The band members 33 and 34 are assembled in the manner hereinbefore described with reference to band members 28 and 30.

In a modification of this invention shown in Fig. 2 rings 18 and 20 are grooved or notched around their inner circumference at their contacting edges for receiving the ends of thin metallic bands 35 and 36, respectively. The horizontal bands 35 and 36 are welded along the edges of their outer circumference into the grooves provided in the rings 18 and 20 as by welds 37 and 38, respectively. When the sections 11 and 12 are in assembled position the metallic bands 35 and 36 are bent so that their edges at the inner circumference contact one another and are there securely welded one to the other by a weld 32 to effect a leak-proof joint between the sections.

In Fig. 3 is shown another modification of this invention in which the metallic bands 39 and 40 are in a horizontal plane when in assembled position. The metallic bands 39 and 40 are welded as at 41 and 42 along their outer edges to the contacting surfaces of the ring members 18 and 20, respectively. The inner edges of the thin metallic bands 39 and 40 are welded together by weld 43. In this modification a gasket 44 is shown between the rings 18 and 20. Such a gasket aids in the shop processing and testing of the case before the final assembly is made. The gasket may, however, be omitted in the assembly as practiced in the field.

The seal between the bands 28 and 30 of L-shape cross-section as shown in Fig. 4 is the type preferred where it is desired to employ solder instead of weld metal. In this modification the horizontal portions of the bands 28 and 30 are separated a short distance to permit the molten solder 45 to flow between the band members and effect a tight and leak-proof seal. It is also to be noted that in order to hold the solder 45 the horizontal portion of band member 28 is longer than the horizontal portion of the band member 30.

It is thus evident that a soldered joint may be substituted for the welded joints between the thin metallic bands employed in sealing the joint between the sections of the case. In the appended claims the expressions "weld" and "being welded" are employed as meaning either a welded or a soldered joint, since an effective leak-proof joint may be produced in accordance with the teachings of this invention with either weld or solder metal.

In practice, the horizontal portions of the thin metal band members are usually made long enough to permit the band members to be cut and then rewelded several times before the band members have to be replaced. By providing this type of band members it will be found that the members initially assembled with the case will last the life-time of the transformer.

It, of course, is to be understood that although this invention has been shown and described with reference to certain specific embodiments thereof, many modifications are possible, and it is therefore not to be restricted except insofar as is necessitated by the prior art and by the spirit of the appended claims.

I claim as my invention:

1. A transformer tank comprising, in combination, a lower case section of major size, an upper case section of lesser size assembled thereon by exterior attaching means, an interior seal comprising metallic bands carried on the upper and lower case sections presenting inwardly projecting meeting edges located inwardly of the internal surface of the case sections, and subsequently welded to unite the bands to provide a sealed joint between the case sections.

2. A transformer tank comprising, in combination, a lower case section of major size, an upper case section of lesser size assembled thereon by exterior attaching means, an interior seal comprising flexible metallic bands carried on the upper and lower case sections presenting inwardly projecting meeting edges located inwardly of the internal surface of the case sections, and subsequently welded to unite the bands to provide a sealed joint between the case sections.

3. A transformer tank comprising, in combination, a lower case section of major size, an upper case section of lesser size assembled thereon by exterior attaching means, an interior seal comprising metallic bands associated with the upper and lower case sections and presenting inwardly projecting meeting portions located inwardly of the internal surface of the case sections, the inwardly projecting meeting portions of the bands being subsequently welded to unite them to provide a sealed joint between the case sections.

4. A transformer tank comprising, in combination, a lower case section of major size, an upper case section of lesser size assembled thereon by exterior attaching means, an interior seal in the tank for sealing the case sections, the interior seal comprising a plurality of metallic bands associated with the upper and lower case sections, a weld uniting one of the metallic bands along one of its edges to the upper case section near the lower end thereof, a weld uniting another of the metallic bands along one of its edges to the lower section near the upper end thereof, the welded metallic bands projecting inwardly to present meeting edges located inwardly of the internal surface of the case sections and cover the joint between the sections, the meeting edges of the metallic bands being subsequently welded to unite them to provide a sealed joint.

WILLIAM G. JAMES.